US012146646B1

(12) United States Patent
Lin

(10) Patent No.: US 12,146,646 B1
(45) Date of Patent: Nov. 19, 2024

(54) LIGHT-EMITTING SPHERE

(71) Applicant: Blackstar Corp., Taipei (TW)

(72) Inventor: Wei-Hung Lin, Taipei (TW)

(73) Assignee: Blackstar Corp., Taipei (TW)

( * ) Notice: Subject to any disclaimer, the term of this patent is extended or adjusted under 35 U.S.C. 154(b) by 0 days.

(21) Appl. No.: 18/412,709

(22) Filed: Jan. 15, 2024

(30) Foreign Application Priority Data

Sep. 19, 2023 (TW) ................................ 112135583

(51) Int. Cl.

*F21V 19/00* (2006.01)
*F21V 3/02* (2006.01)
*F21V 23/02* (2006.01)
*F21V 23/04* (2006.01)
*F21Y 115/10* (2016.01)

(52) U.S. Cl.

CPC ............ *F21V 3/02* (2013.01); *F21V 19/0015* (2013.01); *F21V 23/023* (2013.01); *F21V 23/0492* (2013.01); *F21Y 2115/10* (2016.08)

(58) Field of Classification Search

CPC .... F21V 19/0015; F21V 23/023; F21V 15/02; F21V 23/009; F21Y 2115/10; F21Y 2101/00; A63B 43/06; A63B 2225/74

See application file for complete search history.

(56) References Cited

U.S. PATENT DOCUMENTS 3,639,748 A * 2/1972 Pearson ............... B60Q 1/2626 293/120
2005/0261083 A1* 11/2005 Liao .................. A63B 24/0021 473/570
2010/0020541 A1* 1/2010 Incorvia ................. F21V 31/00 362/249.01
2020/0139203 A1 5/2020 Lin

FOREIGN PATENT DOCUMENTS

CN 201755374 U 3/2011
CN 202802785 U 3/2013
TW M254246 U 1/2005

* cited by examiner

*Primary Examiner* — Omar Rojas Cadima
(74) *Attorney, Agent, or Firm* — Li & Cai Intellectual Property (USA) Office

(57) ABSTRACT

A light-emitting sphere includes a light source device, a light source bracket, a light-transmissive housing, and a light-transmissive elastic layer. The light source device is fixed to the light source bracket. The light source bracket is fixed inside the light-transmissive housing, the light-transmissive housing completely covers the light source device and the light source bracket, a surface of the light-transmissive housing does not have any opening, and an interior of the light-transmissive housing is in an air-tight state. The light-transmissive elastic layer is formed on the surface of the light-transmissive housing.

19 Claims, 7 Drawing Sheets

LIGHT-EMITTING SPHERE

CROSS-REFERENCE TO RELATED PATENT APPLICATION

This application claims the benefit of priority to Taiwan Patent Application No. 112135583, filed on Sep. 19, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a sphere, and more particularly to a light-emitting sphere.

BACKGROUND OF THE DISCLOSURE

In order to enable ball games, such as baseball, cricket, or lacrosse, to be played at night or in a low-light environment, certain ball products are commercially available which enable the ball to be illuminated, thereby allowing the ball to be used in a low-light environment. However, in order to replace the batteries for such products, significant changes need to be made to the structure of the ball. For example, an opening in a skin of a ball needs to be reserved to accommodate battery access for battery replacement. However, when any type of opening is formed on the ball, the characteristics and specifications of the ball can be drastically changed, thus resulting in a drastically different look and handling of the ball from that of traditional baseballs or softballs, and causes the ball to have reduced impact resistance.

SUMMARY OF THE DISCLOSURE

In response to the above-referenced technical inadequacies, the present disclosure provides a light-emitting sphere that provides good protection performance, good shock-absorption performance, and high impact resistance.

In order to solve the above-mentioned problems, one of the technical aspects adopted by the present disclosure is to provide a light-emitting sphere. The light-emitting sphere includes a light source device, a light source bracket, a light-transmissive housing, and a light-transmissive elastic layer. The light source device is fixed to the light source bracket. The light source bracket is fixed inside the light-transmissive housing, the light-transmissive housing completely covers the light source device and the light source bracket, a surface of the light-transmissive housing does not have any opening, and an interior of the light-transmissive housing is in an air-tight state. The light-transmissive elastic layer is formed on the surface of the light-transmissive housing.

In one of the possible or preferred embodiments, the light source device includes a light-emitter, a power member, and a main controller. The main controller is electrically connected to the light-emitter and the power member, the main controller includes a main control circuit board, the power member includes at least one battery disposed on the main control circuit board, and the light-emitter includes at least one light-emitting diode disposed on the main control circuit board.

In one of the possible or preferred embodiments, the light source device further includes a shaking switch electrically connected to the main controller for sensing a shaking. When a shaking is sensed by the shaking switch, the shaking switch turns on the at least one light-emitting diode, and when the shaking is not sensed by the shaking switch after a predetermined period of time has elapsed, the shaking switch turns off the at least one light-emitting diode.

In one of the possible or preferred embodiments, the light source bracket includes an upper bracket and a lower bracket that are assembled to each other in a top-down manner, and the upper bracket has an upper body portion, a plurality of snap hooks that extend and bend outwardly from lateral sides of the upper body portion, and an upper extension that extends upwardly from a top surface of the upper body portion. The lower bracket has a lower body portion, a plurality of lateral extensions that extend outwardly from lateral sides of the lower body portion, and a lower extension that extends downwardly from a bottom surface of the lower body portion. An accommodating groove is recessed from a top surface of the lower body portion to accommodate the light source device, and one of a plurality of snap grooves is formed between each of the lateral extensions and the lower body portion, such that the plurality of snap hooks are correspondingly engaged to the plurality of snap grooves.

In one of the possible or preferred embodiments, the upper extension has an extension column and an arc-shaped disk, and a lower end of the extension column is integrally connected to the upper body portion. An upper end of the extension column is integrally connected to the arc-shaped disk, and at least one of the light-emitting diodes emits light toward the arc-shaped disk.

In one of the possible or preferred embodiments, the light-transmissive housing is a transparent polypropylene (PP) blister package formed by vacuum-forming, and edges of a surface of the light-transmissive housing are sealed by using ultrasonic waves such that the surface of the light-transmissive housing does not have any opening.

In one of the possible or preferred embodiments, the light-transmissive elastic layer is an elastomer injection-molded from an elastic plastic material.

In one of the possible or preferred embodiments, raised patterns are integrally formed on a surface of the light-transmissive elastic layer.

In one of the possible or preferred embodiments, the light-emitting sphere further includes a cover layer that covers the light-transmissive elastic layer.

In one of the possible or preferred embodiments, the cover layer is a partially or fully light-transmissive cover layer.

Therefore, in the light-emitting sphere provided by the present disclosure, by virtue of "the light source device being fixed to the light source bracket," "the light-transmissive housing completely covering the light source device and the light source bracket, a surface of the light-transmissive housing having no opening, and an interior of the light-transmissive housing being in an air-tight state," and "a light-transmissive elastic layer being formed on the surface of the light-transmissive housing," the light source device within the light-emitting sphere can be effectively protected, and a surface elasticity and a shock-absorption performance of the light-emitting sphere can be effectively improved.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
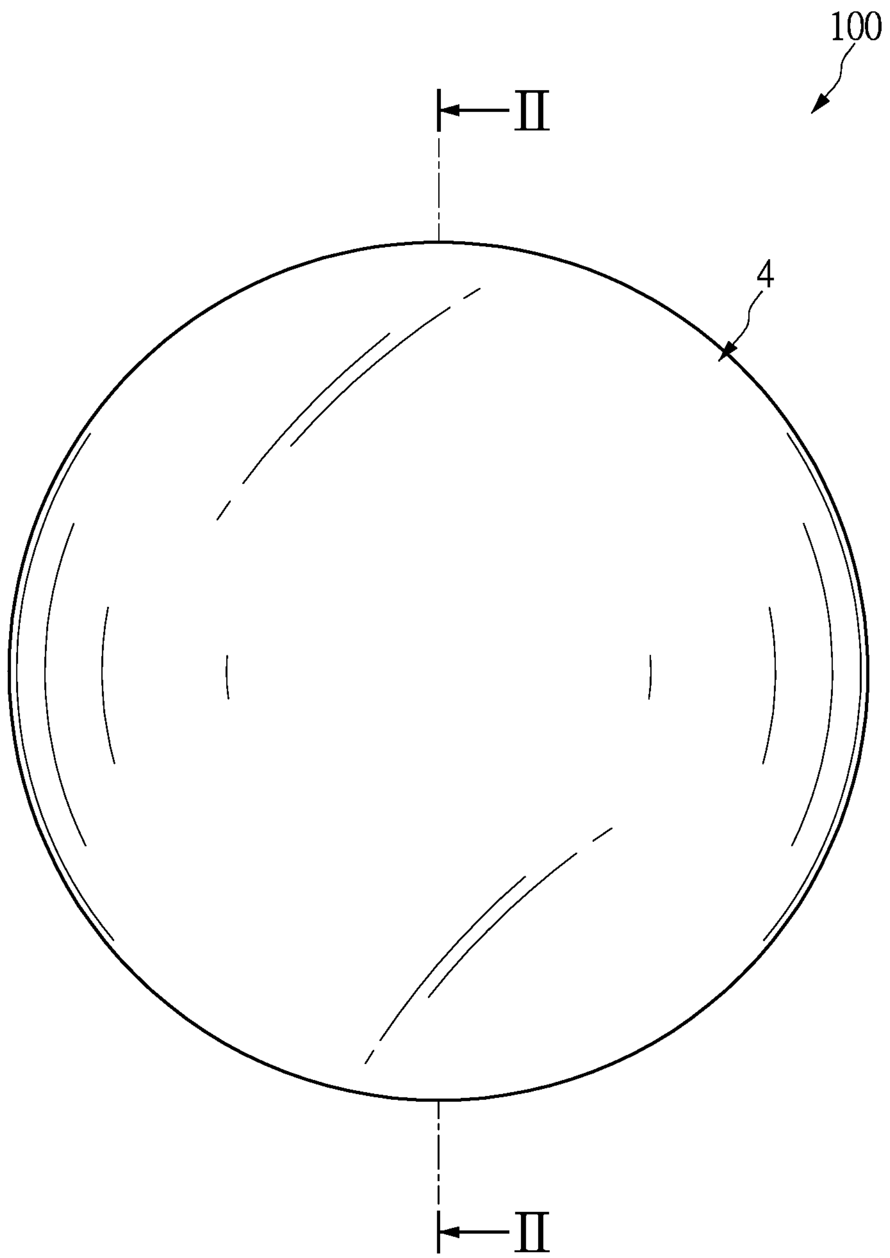
FIG. 1 is a schematic perspective view of a light-emitting sphere according to one embodiment of the present disclosure.
Figure 2:
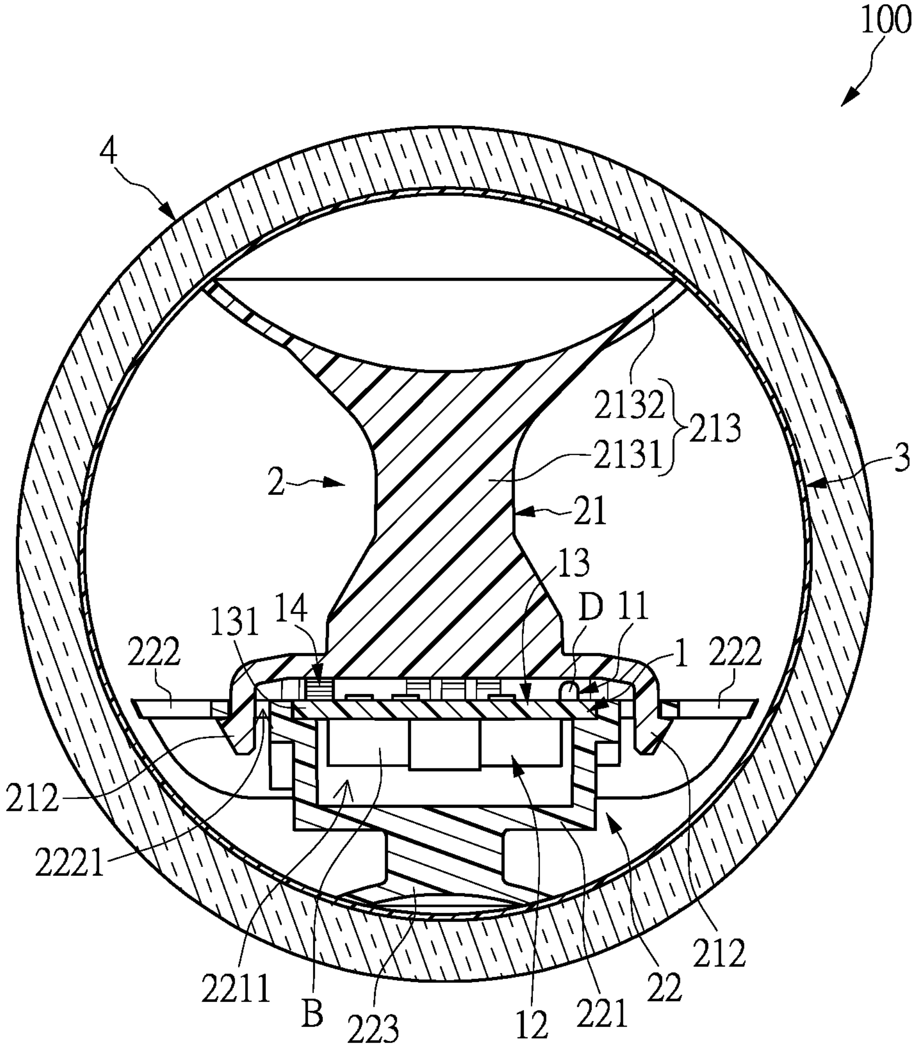
FIG. 2 is a cross-sectional view taken along line II-II of FIG. 1.
Figure 3:
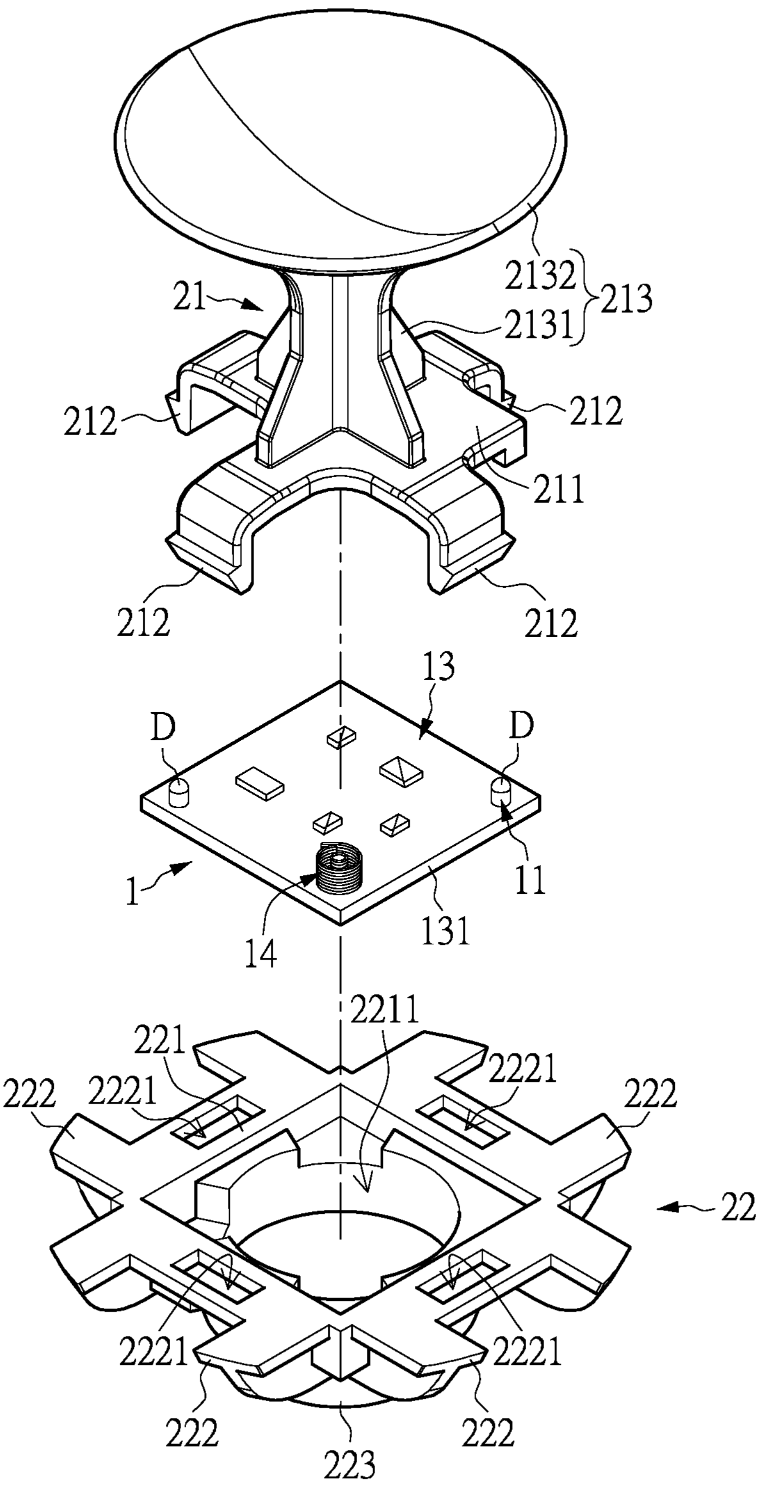
FIG. 3 is a perspective exploded view of a light source bracket according to the present disclosure.
Figure 4:
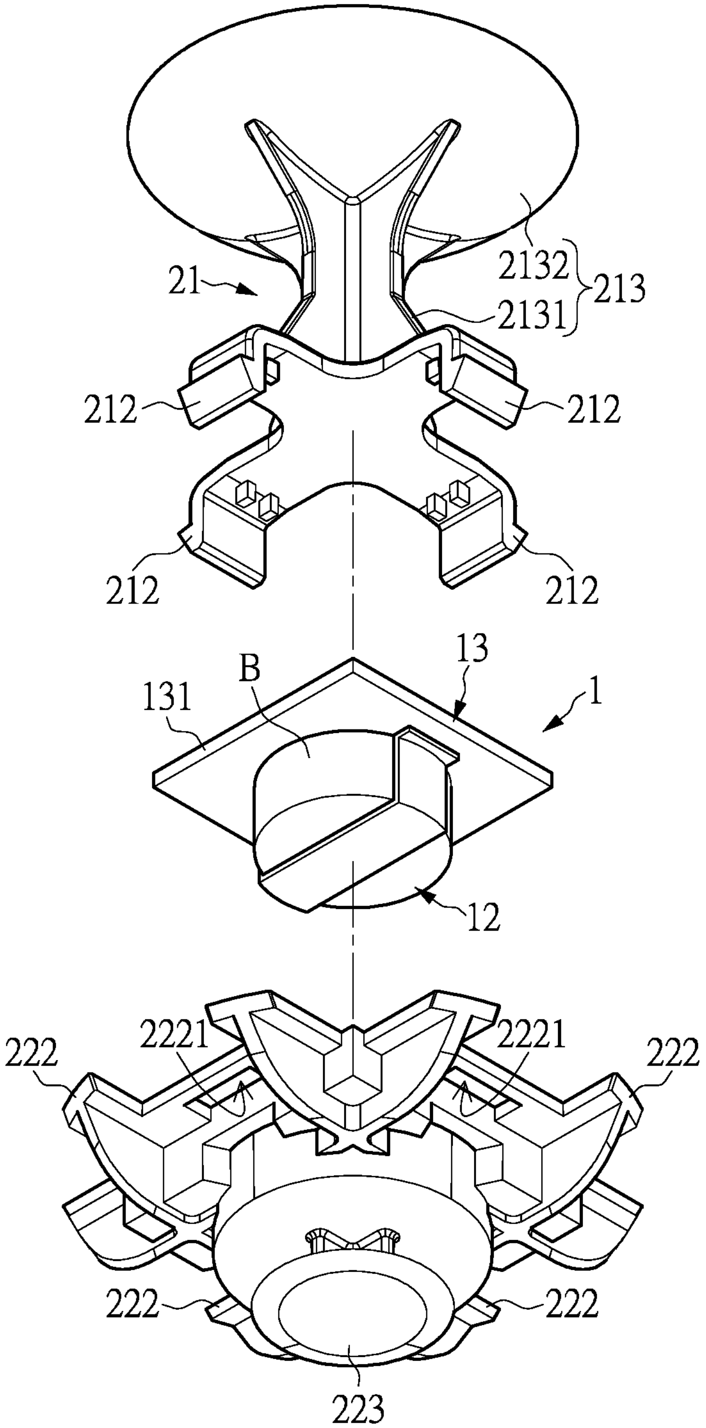
FIG. 4 is another perspective exploded view of a light source bracket according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

EMBODIMENTS

Referring to FIG. 1 to FIG. 4, one embodiment of the present disclosure provides a light-emitting sphere 100. The light-emitting sphere 100 includes a light source device 1, a light source bracket 2, a light-transmissive housing 3, and a light-transmissive elastic layer 4.

In this embodiment, the light source device 1 can include a light-emitter 11, a power member 12, and a main controller 13, and the main controller 13 can be electrically connected to the light-emitter 11 and the power member 12.

Furthermore, the main controller can include a main control circuit board 131, and the main control circuit board 131 can have one or more microcontroller units (MCU) and resistors or capacitances provided thereon. The light-emitter 11 includes at least one light-emitting diode D. In this embodiment, the light-emitter 11 can include two light-emitting diodes D, and the two light-emitting diodes D can be disposed on an upper surface of the main control circuit board 131. Preferably, the two light-emitting diodes D are disposed on diagonal positions on the upper surface of the main control circuit board 131. The power member 12 can include at least one battery B, and the battery B can be disposed on a lower surface of the main control circuit board 131. Preferably, the battery B can be a coin cell battery (such as a CR-2032 coin-cell lithium battery). In this embodiment, the light source device 1 can further include a shaking switch 14 electrically connected to the main controller 13. The shaking switch 14 can be disposed on the upper or lower surface of the main control circuit board 131, and the shaking switch 14 can be used to sense a shaking. Furthermore, when a shaking is sensed by the shaking switch 14, the shaking switch 14 turns on each of the light-emitting diodes D, and when the shaking is not sensed by the shaking switch 14 after a predetermined period of time has elapsed, the shaking switch 14 turns off each of the light-emitting diodes D, so as to extend a usage time of the battery B. Furthermore, the main controller 13 can have a backup power supply mode, such that when one of the light-emitting diodes D is damaged, the remaining light-emitting diodes D can still emit light.

In this embodiment, the light source device 1 is fixed to the light source bracket 2, such that the light source device 1 is fixed inside the light-transmissive housing 3 through the light source bracket 2.

Furthermore, the light source bracket 2 includes an upper bracket 21 and a lower bracket 22 that are assembled to each other in a top-down manner. The upper bracket 21 has an upper body portion 211, a plurality of snap hooks 212 that extend and bend outwardly from lateral sides of the upper body portion 211, and an upper extension 213 that extends upwardly from a top surface of the upper body portion. The lower bracket 22 has a lower body portion 221, a plurality of lateral extensions 222 that extend outwardly from lateral sides of the lower body portion 221, and a lower extension 223 that extends downwardly from a bottom surface of the lower body portion 221. Moreover, an accommodating groove 2211 is recessed from a top surface of the lower body portion 221 to accommodate the light source device 1. One of a plurality of snap grooves 2221 is formed between each of the lateral extensions 222 and the lower body portion 221, such that the plurality of snap hooks 212 are correspondingly engaged to the plurality of snap grooves 2221. In addition, the upper extension 213 and the lower extension 223 are vertically disposed to be opposite to each other and respectively abut against an inner surface of the light-transmissive housing 3, thereby allowing the light source device 1 to be properly fixed inside the light-transmissive housing 3 through the light source bracket 2.

In addition, the upper extension 213 has an extension column 2131 having a cross-shaped cross-section and an arc-shaped disk. A lower end of the extension column 2131 is integrally connected to the upper body portion 211, and an upper end of the extension column 2131 is integrally connected to the arc-shaped disk 2132 to support the arc-shaped disk 2132. At least one of the light-emitting diodes D of the light-emitter 11 emits light toward the arc-shaped disk 2132, such that an arced surface of the arc-shaped disk 2132 can be used to reflect the emitted light, thereby improving an illuminance and a light-emitting area of the light-emitter 11. Moreover, light-reflective substances can be coated on the arced surface of the arc-shaped disk 2132 to further improve the reflection capability of the arc-shaped disk 2132.

In this embodiment, the light source device 1 is fixed inside the light-transmissive housing 3 through the light source bracket 2, and the light-transmissive housing 3 can completely cover the light source device and the light source bracket 2. Furthermore, the light-transmissive housing 3 is a transparent polypropylene blister package formed by vacuum-forming, and edges of a surface of the light-transmissive housing 3 are sealed by using ultrasonic waves, such that the surface of the light-transmissive housing 3 does not have any opening and an interior of the light-transmissive housing 3 is in an air-tight state. That is, an air-tight space is formed in the light-transmissive housing 3 for preventing the light-transmissive housing 3 from being easily deformed. Furthermore, light guiding powder can be uniformly dispensed on the inner surface of the light-transmissive housing 3, such that a light beam that is emitted outward from the sphere is mild and uniformly distributed.

In this embodiment, the light-transmissive elastic layer 4 is formed on an outer surface of the light-transmissive housing 3, and the light-transmissive elastic layer 4 is an elastomer formed by injection-molding an elastic plastic material. Furthermore, the light-transmissive elastic layer 4 can be formed on the outer surface of the light-transmissive housing 3 by injection-molding melted thermoplastic polyurethane (TPU). In detail, granular TPU is heated to a melting temperature, and the melted granular TPU is injected into a mold in which the light-transmissive housing 3 is located, so as to form the light-transmissive elastic layer 4 on the outer surface of the light-transmissive housing 3 by injection-molding. In addition, a material of the light-transmissive elastic layer 4 may also be polyurethane (PU), such as a PU foaming agent, or a PU foaming adhesive. Furthermore, a diameter of the light-transmissive housing 3 is preferably 6 cm, and the light-transmissive housing 3 may also have a diameter that is similar to a diameter of a ball body of a baseball or a softball, allowing a ratio of a diameter of the light-transmissive housing 3 to a thickness of the light-transmissive elastic layer 4 to be greater than or equal to 12:1, such that an improvement of the surface elasticity and shock-absorption performance of the entire sphere can be ensured.

Figure 5:
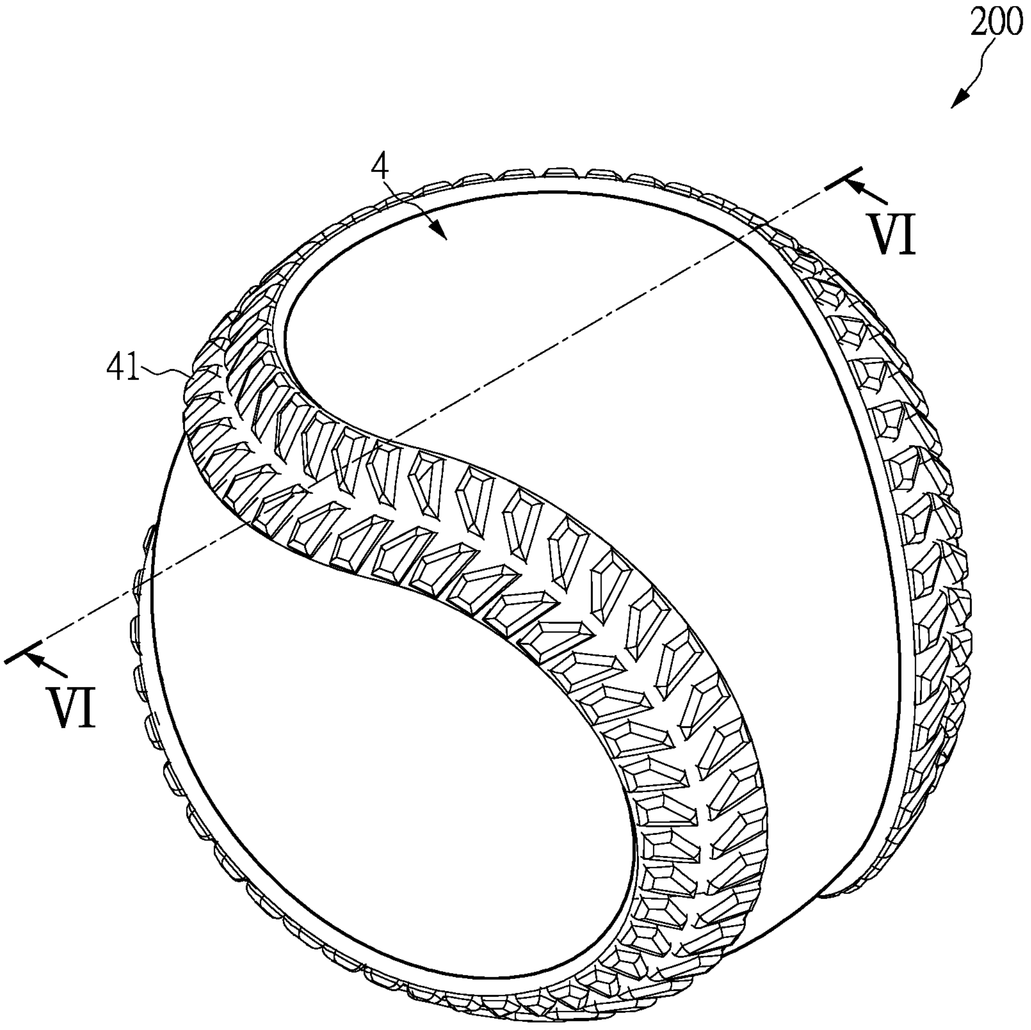
FIG. 5 is a schematic perspective view of a light-emitting sphere according to one embodiment of the present disclosure.
Figure 6:
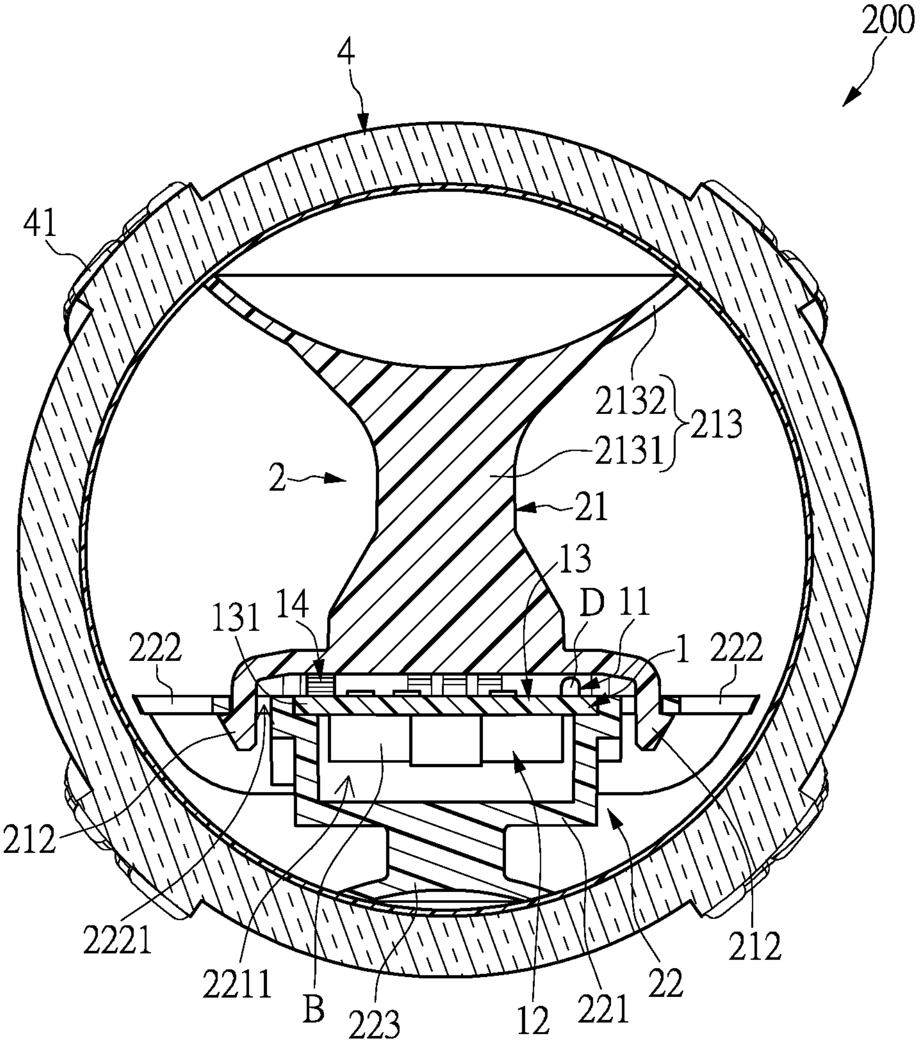
FIG. 6 is a cross-sectional view taken along line VI-VI of FIG. 5.

In one embodiment, according to FIG. 5 and FIG. 6, raised patterns 41 are integrally formed on a surface of the light-transmissive elastic layer 4 of a light-emitting sphere 200. The raised patterns 41 can improve the surface elasticity and shock-absorption performance of the entire sphere by a certain degree. On the other hand, the raised patterns 41 can improve friction and slip-proof performance of the sphere to achieve a good handling experience. In this embodiment, the raised patterns 41 can be similar to a pattern of a surface of a baseball or a softball, or a pattern of a surface of other types of ball.

Figure 7:
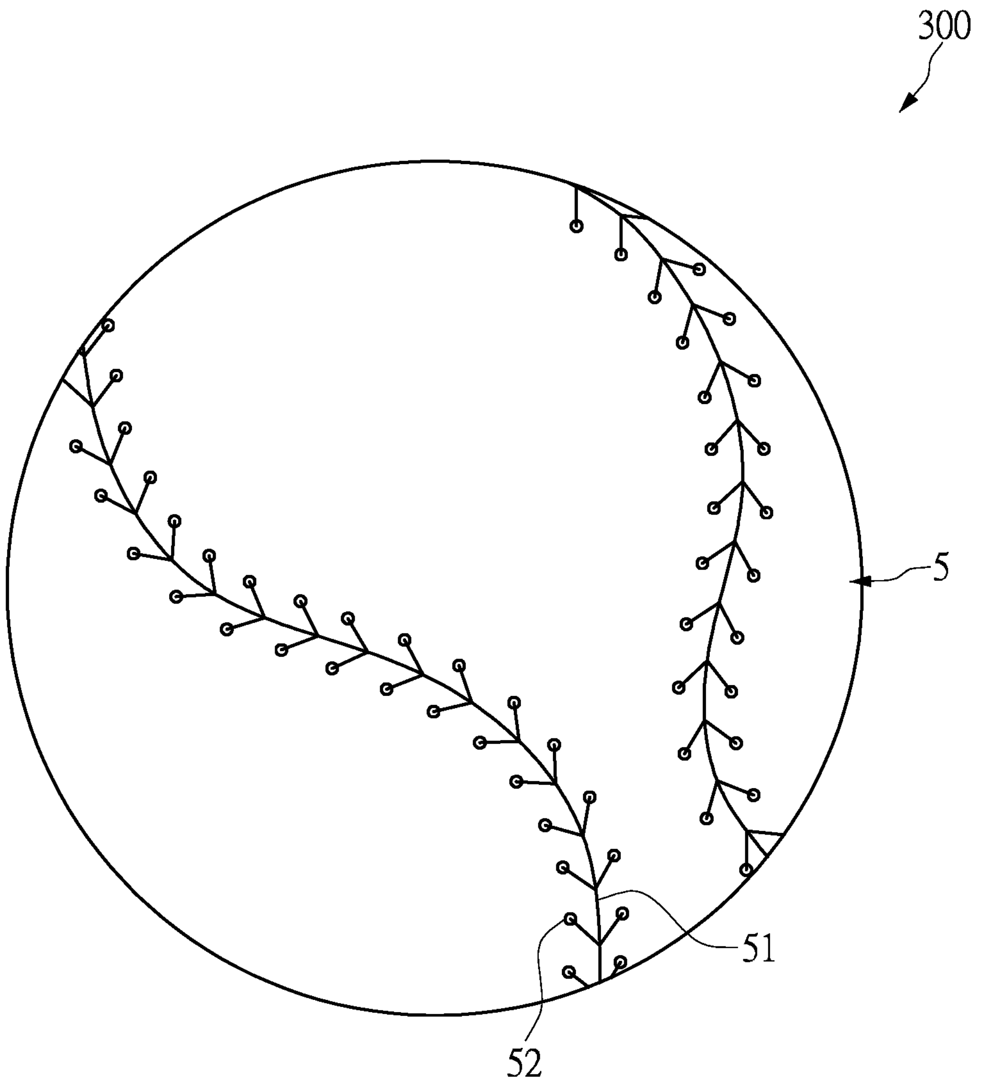
FIG. 7 is a schematic perspective view of a light-emitting sphere according to one embodiment of the present disclosure.

In one embodiment, according to FIG. 7, a light-emitting sphere 300 may further include a cover layer 5 (such as a cover skin on a baseball or a softball). In addition, the cover layer 5 can be a cover layer that is partially light-transmissive or fully light-transmissive, and the cover layer 5 can also be non-light-transmissive. Furthermore, the cover layer 5 can cover on an outer surface of a sphere as shown in FIG. 1, so as to be in a state as shown in FIG. 7. Moreover, at least one seam slit 51 and a plurality of seam holes 52 located on two sides of each seam slit 51 are formed on the cover layer 5. Therefore, light can be transmitted outward through the seam slit 51, the seam holes 52, or through the cover layer 5, such that bright light can be transmitted outward from the surface of the light-emitting sphere of the present disclosure along the seam slit 51, the seam holes 52, or through the cover layer 5, thereby facilitating the user to clearly identify a flight or moving path of the light-emitting sphere through observing the light emitted from the surface of the light-emitting sphere even in low-light or nighttime environments.

In addition, the cover layer 5 can be skins of other types of balls such as a skin of a soccer ball or a skin of a basketball, and the cover layer 5 can cover onto the surface of the ball body by adhesion. That is, the cover layer 5 can be skins of balls for various ball games such as baseball, cricket, or lacrosse, and can be produced according to different practical requirements.

Beneficial Effects of the Embodiments

In conclusion, in the light-emitting sphere provided by the present disclosure, by virtue of "the light source device being fixed to the light source bracket," "the light-transmissive housing completely covering the light source device and the light source bracket, a surface of the light-transmissive housing having no opening, and an interior of the light-transmissive housing being in an air-tight state," and "a light-transmissive elastic layer being formed on the surface of the light-transmissive housing," the light source device within the light-emitting sphere can be effectively protected, and a surface elasticity and a shock-absorption performance of the light-emitting sphere can be effectively improved. Moreover, a more preferable advantage of the present disclosure is that, the light-emitting sphere has no relatively large opening, thereby allowing the light-emitting sphere to have a high impact resistance.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A light-emitting sphere, comprising:

a light source device;

a light source bracket, wherein the light source device is fixed to the light source bracket;

a light-transmissive housing, wherein the light source bracket is fixed inside the light-transmissive housing, the light-transmissive housing completely covers the light source device and the light source bracket, a surface of the light-transmissive housing has no opening, and an interior of the light-transmissive housing is in an air-tight state; and a light-transmissive elastic layer formed on the surface of the light-transmissive housing;

wherein the light source bracket includes an upper bracket and a lower bracket that are assembled to each other in a top-down manner, the upper bracket has an upper body portion and an upper extension that extends upwardly from a top surface of the upper body portion, the lower bracket has a lower body portion and a lower extension that extends downwardly from a bottom surface of the lower body portion, and an accommodating groove is recessed from a top surface of the lower body portion and located beneath a bottom surface of the upper body portion to accommodate the light source device.

2. The light-emitting sphere according to claim 1, wherein the light source device includes a light-emitter, a power member, and a main controller; wherein the main controller is electrically connected to the light-emitter and the power member, the main controller includes a main control circuit board, the power member includes at least one battery disposed on the main control circuit board, and the light-emitter includes at least one light-emitting diode disposed on the main control circuit board.

3. The light-emitting sphere according to claim 2, wherein the light source device further includes a shaking switch electrically connected to the main controller for sensing a shaking; wherein, when a shaking is sensed by the shaking switch, the shaking switch turns on the at least one light-emitting diode, and when the shaking is not sensed by the shaking switch after a predetermined period of time has elapsed, the shaking switch turns off the at least one light-emitting diode.

4. The light-emitting sphere according to claim 1, wherein the upper bracket has a plurality of snap hooks that extend and bend outwardly from lateral sides of the upper body portion and one of a plurality of snap grooves is formed between each of the lateral extensions and the lower body portion, such that the plurality of snap hooks are correspondingly engaged to the plurality of snap grooves.

5. The light-emitting sphere according to claim 1, wherein the upper extension has an extension column and an arc-shaped disk, and a lower end of the extension column is integrally connected to the upper body portion; wherein an upper end of the extension column is integrally connected to the arc-shaped disk, and at least one of light-emitting diodes of the light source device emits light toward the arc-shaped disk.

6. The light-emitting sphere according to claim 1, wherein the light-transmissive housing is a transparent polypropylene blister package formed by vacuum-forming, and wherein edges of a surface of the light-transmissive housing are sealed by using ultrasonic waves such that the surface of the light-transmissive housing does not have any opening.

7. The light-emitting sphere according to claim 1, wherein the light-transmissive elastic layer is an elastomer injection-molded from an elastic plastic material.

8. The light-emitting sphere according to claim 1, wherein raised patterns are integrally formed on a surface of the light-transmissive elastic layer.

9. The light-emitting sphere according to claim 1, further comprising a cover layer that covers the light-transmissive elastic layer.

10. The light-emitting sphere according to claim 9, wherein the cover layer is a partially or fully light-transmissive cover layer.

11. A light-emitting sphere, comprising:

a light source device;

a light source bracket, wherein the light source device is fixed to the light source bracket;

a light-transmissive housing, wherein the light source bracket is fixed inside the light-transmissive housing, the light-transmissive housing completely covers the light source device and the light source bracket, a surface of the light-transmissive housing has no opening, and an interior of the light-transmissive housing is in an air-tight state; and a light-transmissive elastic layer formed on the surface of the light-transmissive housing;

wherein the light source bracket includes an upper bracket and a lower bracket that are assembled to each other in a top-down manner, and the upper bracket has an upper body portion, a plurality of snap hooks that extend and bend outwardly from lateral sides of the upper body portion, and an upper extension that extends upwardly from a top surface of the upper body portion; wherein the lower bracket has a lower body portion, a plurality of lateral extensions that extend outwardly from lateral sides of the lower body portion, and a lower extension that extends downwardly from a bottom surface of the lower body portion; wherein an accommodating groove is recessed from a top surface of the lower body portion to accommodate the light source device, and one of a plurality of snap grooves is formed between each of the lateral extensions and the lower body portion, such that the plurality of snap hooks are correspondingly engaged to the plurality of snap grooves.

12. The light-emitting sphere according to claim 11, wherein the light source device includes a light-emitter, a power member, and a main controller; wherein the main controller is electrically connected to the light-emitter and the power member, the main controller includes a main control circuit board, the power member includes at least one battery disposed on the main control circuit board, and the light-emitter includes at least one light-emitting diode disposed on the main control circuit board.

13. The light-emitting sphere according to claim 12, wherein the light source device further includes a shaking switch electrically connected to the main controller for sensing a shaking; wherein, when a shaking is sensed by the shaking switch, the shaking switch turns on the at least one light-emitting diode, and when the shaking is not sensed by the shaking switch after a predetermined period of time has elapsed, the shaking switch turns off the at least one light-emitting diode.

14. The light-emitting sphere according to claim 11, wherein the upper extension has an extension column and an arc-shaped disk, and a lower end of the extension column is integrally connected to the upper body portion; wherein an upper end of the extension column is integrally connected to the arc-shaped disk, and at least one of light-emitting diodes of the light source device emits light toward the arc-shaped disk.

15. The light-emitting sphere according to claim 11, wherein the light-transmissive housing is a transparent polypropylene blister package formed by vacuum-forming, and wherein edges of a surface of the light-transmissive housing are sealed by using ultrasonic waves such that the surface of the light-transmissive housing does not have any opening.

16. The light-emitting sphere according to claim 11, wherein the light-transmissive elastic layer is an elastomer injection-molded from an elastic plastic material.

17. The light-emitting sphere according to claim 11, wherein raised patterns are integrally formed on a surface of the light-transmissive elastic layer.

18. The light-emitting sphere according to claim 11, further comprising a cover layer that covers the light-transmissive elastic layer.

19. The light-emitting sphere according to claim 18, wherein the cover layer is a partially or fully light-transmissive cover layer.

* * * * *